2,879,201

COCCIDIOSTATIC REMEDIES

Harold Van Essen, Neal F. Morehouse, James P. Heotis, Arthur W. Walde, and Thomas W. Zbornik, Charles City, Iowa, assignors to Dr. Salsbury's Laboratories, a corporation of Iowa No Drawing. Application October 12, 1955
Serial No. 540,152

5 Claims. (Cl. 167—53.1)

This invention relates to new veterinary compositions and methods adapted for the prevention, alleviation, and control of coccidiosis in poultry and other domesticated animals.

Coccidiosis is a contagious gastro-intestinal disorder of infective origin, which is prevalent in fowl, but may also occur in diverse other types of farm animals such as calves and lambs. The condition may be produced by a variety of protozoan parasites, among which *Eimeria tenella, Eimeria necatrix,* and *Eimeria acervulina,* are the most common and predominant pathogenic species in the avian kingdom. The infective organisms invade the digestive tract of the animal in form of encysted oöspores or oöcysts which are spread through the droppings and feed contaminated therewith. In the host they undergo their natural life-cycle, rapidly multiply, and, after release of the sporozoites, erode the epithelial tissue of the intestinal linings.

All of the coccidiogenic parasites produce with certain variations the following pathological syndrome in susceptible chickens: The first manifestation of the disease is anorexia with decreasing feed and water intake which later leads to progressive unthriftiness, emaciation and weakness. Since ingestion of feed is markedly reduced, the bowel of the bird lacks the normal feed constituents, as a result of which the droppings change in their appearance. They no longer contain the normal components of waste roughage and undigested food particles. In addition, profuse internal hermorrhage imparts to the droppings a characteristic hemochromatic color the shade of which varies with the type and severity of the disease and the amount of mucus secreted into the bowel. In acervulina infections a moderate discharge of blood, mixed with cheesy material of clabber-milk like appearance is observed. The droppings of the affected animals provide a characteristic clinical criterium for the diagnosis and the determination of the severity of the coccidiosis attack. They are scored by veterinarians in terms of "maximum deviations" from their normal appearance, the record being taken at the peak of the infection when the bird is passing the largest amount of bloody mucus. In the case of *Eimeria tanella* and *Eimeria necatrix* infections the droppings can be recorded in color photographs for comparative evaluations. The ratings assessed for their "maximum deviations" range from none to slight, moderate, severe and very severe. *Eimeria acervulina* produces less evidence of free blood or bloody mucus in the droppings which are therefore scored in accordance with their watery, cheesy, or clabber-milk like appearance. The aspect of the droppings as a clinical index gains added significance in view of its close and direct relationship to the trends in weight changes exhibited by the afflicted animals. The larger the "maximum deviations" of the feces from normalcy, the smaller the weight gains of the birds, while, on the other hand, the potency of a coccidiostatic agent is reflected not only in a more regular appearance of the droppings, but likewise in an improved growth. Other symptoms of the disease are dehydration of the body tissues and lesions in the intestinal tract which are characteristic of the species of the coccidia involved. Morbidity and retarded growth cause serious financial losses to the poultry industry in that the market value of the birds is considerably diminished. The most damaging effect of the disease, however, is marked by its high mortality which may claim twenty percent of a flock, especially during the first few months of their lives. Prophylaxis and control of this epizootic, therefore, is primarily directed at the prevention of death losses, since the poultry grower has no opportunity to recover the total loss of a dead bird.

Various therapeutic remedies have been suggested for the alleviation and control of coccidiosis. Their administration in manifold forms, however, has not always been found satisfactory for numerous reasons. Some of the agents require substantial dosages in order to develop their full measure of potency and their level of therapeutic activity comes dangerously close to the threshold of toxicity. Since these drugs are difficult to produce and rather expensive, their high concentrations required to bring about the desired therapeutic result make their use very costly for the chicken raiser. Other remedies are limited in their efficacy to just one species of coccidiogenic protozoa, be it *Eimeria tenella, Eimeria necatrix,* or *Eimeria acervulina.*

In our search for an improved coccidiostatic remedy which is readily available, of relatively moderate price and extremely potent in low concentrations against the most prevalent coccidiogenic parasites without any toxic effects, we have discovered that a substance, chemically known as 4,4'-dinitrocarbanilide, possesses these and many other valuable properties. We have found, however, that the pharmacological activity of this chemical depends on its particle size in which it is applied. For practical results, the drug must be present in a finely dispersed state in which the size of the particles does not exceed 10 micra or 0.01 mm. in diameter and is preferably kept below 5 micra or 0.005 mm. It is not required that each of the particles conforms to the aforementioned size limits which can be hardly maintained even under the most perfect grinding conditions. For the purpose of this invention it is entirely sufficient that the major portion of the drug particles lies below 10 micra so that an approximate average of the magnitude prevails.

It is therefore a critical aspect of the present invention to prevent and control coccidiosis in animals by administering 4,4'-dinitrocarbanilide in a finely dispersed or micronized state wherein the compound particles have an approximate average size of no more than 10 micra and preferably measure not in excess of 5 micra.

4,4'-dinitrocarbanilide is a known chemical of the formula

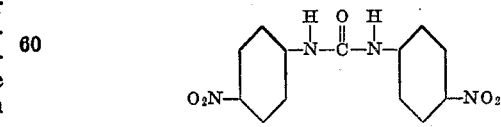

It is a yellowish powder, insoluble in water, and has a melting point of 330 to 333° C. in its pure crystalline form. It may be prepared by nitrating 1,3-diphenylurea or by reacting 4-nitroaniline with urea at temperatures between 130 and 220° C. When produced by these methods, the substance takes the form of large macrocrystalline needles which must be subjected to vigorous pulverization in an air micronizer to bring about the desired comminute condition.

We have, however, also discovered that the drug can be obtained in a state of extreme fineness and dispersion with a particle size of less than 10 micra, if it is prepared from 4-nitrophenylisocyanate by mixing the chemical with pulverulant or granular moisture-containing materials, such as fuller's earth and poultry feed. In this reaction, one mol each of 4-nitrophenylisocyanate and water first form one mol of 4-nitroaniline with the elimination of carbon dioxide; the nitroaniline in turn combines with a second mol of 4-nitrophenylisocyanate into 4,4'-dinitrocarbanilide. While this hydration-decarboxylation process, when carried out in water under normal conditions, results in the formation of inactive 4,4'-dinitrocarbanilide of macroscopic particle size, the compounds accrues in a finely subdivided therapeutically active state, if it is formed in situ in the aforesaid hydrous reaction medium.

Similarly, 4,4'-dinitrocarbanilide in submicroscopic fineness below 10 micra can also be produced by dissolving the compound or the reaction mass from carbanilide and a nitrating agent in 95 to 98% sulfuric acid and shooting a thin stream of the solution into a large excess of water with violent agitation. For best results a high ratio of diluted liquid to concentrated sulfuric acid is required and a considerable amount of turbulence should be maintained during the precipitation. In practical operation a thin stream of the sulfuric acid solution containing the compound is projected against the rotating stirrer or the mass is pulled through a water jet.

Since, as hereinafter more fully explained, the drug is preferably administered to the animals in combination with a solid, orally ingestible vehicle, such as edible substances, our new coccidiostatic remedies include not only admixtures of said carriers with previously micronized 4,4'-dinitrocarbanilide, but also compositions of edible materials in which the active ingredient has formed in situ, such as by incorporating 4-nitrophenylisocyanate into moisture-containing feed or feed admixed with clays and similar solid, nontoxic diluents containing water. The main criterium of this invention being the finely divided, dispersed and micronized form of the therapeutic constituent, it is accordingly without importance by which method this state of comminution is attained.

The efficacy of our improved coccodiostatic remedy manifests itself in a substantial control of hemorrhage coupled with appreciable weight gains of the treated birds and a complete prevention of mortality. When the chemical is intended for prophylactic purposes, an outbreak of coccidiosis can be successfully averted by continuous administration of the drug at low levels in the feed. In order to combat an already existing infection, a poultry ration medicated with the active ingredient in suitable higher concentrations is placed before the birds for consumption ad libitum, as soon as the first clinical signs of the disease indicate an exposure of the flock. The drug intake requisite to achieve the coccidiostatic effect varies with the age and size of the birds, but stands in direct proportion to their feed consumption, so that it will be assured at all times, if the compound is present at the proper dosage level. Treatment is to be continued for 11 to 14 days, but may be extended for a longer period of time, if the infection is of more severe nature.

The effective dosages of our new coccidiostatic drug have been found to be exceptionally low as compared with some of the other remedies used heretofore. A poultry feed containing the compound in as small a concentration at 0.00625% by weight is of high protective potency in Eimeria necatrix infections. In order to ensure full control of pathological symptoms and mortality in diseased flocks, higher dosages of 0.0125% to 0.025% are required. The usability of our new drug in these sparing quantities, particularly on the prophylactic level, offers a distinct economic advantage to the poultry industry which generally depends upon high-priced chemicals for a successful conduct of its chemotherapeutic medication program.

In the following examples the activity of our new remedy will be illustrated by the degree in which hemorrhage is checked, mortality prevented and weight gains are achieved in coccidiosis infected chickens. For each test perfectly healthy New Hampshire chicks were reared in electrically heated brooding batteries, and particular care was taken to protect the birds from extraneous exposure to coccidia and other infections. When the animals were about six weeks old, they were placed in individual cages which were thoroughly cleaned and disinfected. Feed- and water-cups were sterilized with boiling water. The birds were observed for one to two days for possible sickness; if such occurred, the afflicted specimens were replaced by healthy substitutes. During this observation period the chicks became adjusted to their new environment and acquired test-fitness. Each chick was weighed daily, beginning on the day of the experiment. The birds were then moved from one cage to another so as to ensure approximate equality of the mean weights of each test group.

Generally, three infected groups of four birds each were used in every experiment. The first group received 4,4'-dinitrocarbanilide in regular particle size of varying magnitude. A second group was treated at the same dosage level with the compound in micronized or dispersed condition. The third batch was left without medication and served as control. For artificial infection a single dose of 100,000 sporulated oöcysts of Eimeria tenella or Eimeria necatrix was given to each chick, while Eimeria acervulina was introduced by the inoculation of 5,000,000 oöcysts into each bird on two consecutive days. Medication was started three days prior to inoculation of all the three infective protozoa and continued for a total of 13 days for Eimeria nectarix and Eimeria acervulina, and of 11 days for Eimeria tenella, at the end of which the chemotherapeutic value of the compound could be assessed with finality. It has been uniformly found that the efficacy of the drug does not so much depend upon the length of the treatment as upon the start of the medication with respect to the infection time.

Beginning on the fourth day after artificial infection and every day thereafter until the end of the experiment the droppings of each bird were carefully examined and their deviations from their normal appearance were graded in accordance with accepted standards in the veterinary arts. In the case of Eimeria tenella, the amount of hemorrhage in the droppings collected in metal pans beneath the birds was rated and recorded in terms of 0=none, B=slight, BB=moderate, BBB=severe, and BBBB=very severe hemorrhage. A chick seldom died with a rating of less than 3 or 4 B's. Concurrently therewith current weight and mortality records were kept. In a similar manner the excremental abnormalities due to Eimeria necatrix were determined and registered. This type of coccidiosis produces a bloody mucus with a characteristic appearance which can be easily distinguished from normal droppings. The scoring of severity follows the same schedule as that for Eimeria tenella. As previously noted, the droppings of birds infected with Eimeria acervulina are characterized by either a watery, cheesy, or clabber-milk like consistency. Deviations from normalcy are here scored as 0=none, +=slight, ++=moderate, +++=severe, and ++++=very severe.

The preparation of the medicated feed composition was carried out by one of the following methods. In those of the experiments, where 4,4'-dinitrocarbanilide was a product of mechanical micronization, the particle size was first determined by microscopic observation and other micromeritic procedures, as are well known in the art. The larger particle sizes of the comparative test material above 10 micra were established by passing the powder through testing sieves of National Bureau of Standards specifications. The compound was first mixed with a small amount of poultry feed, such as grain, mash, scratch and similar rations so as to produce a stock concentrate for more convenient handling. A proportionate amount of this premix was thereupon introduced into the bulk of the ration with thorough stirring and shuffling, until a uniform blend of even distribution was obtained.

When the drug was prepared in situ in the feed, one part of 4-nitrophenylisocyanate was mixed with three parts of fuller's earth which has a normal water content of approximately 4%. The conversion product constituting 4,4'-dinitrocarbanilide in a finely dispersed phase of below 10 micra accrued in an amount of 0.92083 part. In order to produce a concentration of 0.023% of the active ingredient in the feed, 0.1% of the premix was incorporated into 100 parts of poultry ration. It is evident that fuller's earth can be replaced by other clays like kaolin, bentonite, montmorillonite and similar materials and that such obvious equivalents are embraced within the scope of this invention. As a further modification, the 4-nitrophenylisocyanate was also directly added to the poultry feed which ordinarily contains 7 to 15% of moisture. The starting material was first coarsely ground and then mixed with the fowl ration in a mechanical feed mixer for a period of 15 to 20 minutes to assure homogeneity.

The following table is a representative summary of data selected from a considerable experimental record illustrating the invention. The tests are listed in numerical order as given in column 1. The second column shows the concentration of 4,4'-dinitrocarbanilide in the feed, while column 3 discloses the varying particle sizes of the active ingredient. Where the designation is given as <10 micra, the exact particle size was not established, except for its range below the critical level. The symbol merely indicates that the material was present in a finely subdivided and dispersed state below the size of 10 micra, eliciting the same pharmacological response as its mechanically micronized equivalent. Column 4 shows in percentages the extent to which the compound controlled the clinical symptoms of the disease as manifested by the appearance of the droppings. In experiment No. 7, for instance, the droppings record showed a total of 15 B's for the four infected and treated birds, while the maximum deviation for the four controls was 16 B's, which means that the infection was able to uniformly produce completely abnormal droppings in all four of the inoculated, but non-medicated speciments. The droppings of the treated lot, therefore, showed a deviation from normalcy equal to $15/16 \times 100$ or 93.7%. The effectiveness of the compound was accordingly only 100—93.7% or roundly 6%. In experiment No. 14 the maximum deviation for the four test specimens was 0, whereas the four controls scored a total of 16 B's. It follows that the treated group had a maximum deviation of $0/16 \times 100 = 0\%$, which translates itself into 100% efficacy of the drug employed. Column 5 lists the weight changes of the birds observed and computed after the close of the treatment period. It will be noticed that a number of tests, most of which involve comparative data of the inactive form of the compound, are devoid of listings. This in due to the fact that some birds in these groups succumbed to the disease before the end of the experiment. Under these conditions it was not feasible to compute a mean weight-gain or -loss which would have been comparable with the gains of all the survivors in the successfully treated group. In columns 6 and 7 appear the mortality rates of the treated and untreated lots. The figure 1/4 in experiment 7, for instance, signifies that one out of four treated birds died of the infection, and 3/4 means that three out of four animals were fatalities in the untreated group.

Table I
EIMERIA NECATRIX

| Test No. | Conc. Feed | Particle Size, Micra | Percent Control of Symptoms | Weight Changes | Mortality Treated Group | Mortality Untreated Group |
|---|---|---|---|---|---|---|
| 1 | 0.01250 | >10 | 0 |  | 3/4 | 3/4 |
| 2 | 0.02500 | >10 | 0 |  | 2/4 | 3/4 |
| 3 | 0.02500 | >10 | 0 |  | 2/4 | 3/4 |
| 4 | 0.02500 | 177 | 0 |  | 3/4 | 3/4 |
| 5 | 0.02500 | 420-250 | 6 |  | 2/4 | 3/4 |
| 6 | 0.02500 | 420 | 6 |  | 1/4 | 3/4 |
| 7 | 0.02500 | 420 | 6 |  | 1/4 | 3/4 |
| 8 | 0.00625 | <10 | 25 | −17.2 | 0/4 | 3/4 |
| 9 | 0.01250 | <10 | 62.5 | +93.2 | 0/4 | 3/4 |
| 10 | 0.01250 | <10 | 94 | +236.5 | 0/4 | 3/4 |
| 11 | 0.02500 | <10 | 94 | +259.5 | 0/4 | 3/4 |
| 12 | 0.02500 | <10 | 100 | +289.7 | 0/4 | 3/4 |
| 13 | 0.02500 | <10 | 87 | +187.5 | 0/4 | 4/4 |
| 14 | 0.02500 | <10 | 100 | +240.0 | 0/4 | 3/4 |
| 15 | 0.02300 | <10 | 80 | +135.8 | 0/4 | 3/4 |
| 16 | 0.02500 | 2-5 | 87 | +166.5 | 0/4 | 4/4 |
| 17 | 0.04600 | <10 | 100 | +200.5 | 0/4 | 4/4 |

EIMERIA TENELLA

| Test No. | Conc. Feed | Particle Size, Micra | Percent Control of Symptoms | Weight Changes | Mortality Treated Group | Mortality Untreated Group |
|---|---|---|---|---|---|---|
| 18 | 0.02500 | 3,150 | 0 |  | 1/4 | 2/4 |
| 19 | 0.02500 | 74 | 25 |  | 1/4 | 4/4 |
| 20 | 0.02500 | <10 | 94 | +178.2 | 0/4 | 1/4 |
| 21 | 0.02500 | <10 | 81 | +237.0 | 0/4 | 1/4 |
| 22 | 0.05000 | <10 | 95 | +170.8 | 0/4 | 2/4 |

EIMERIA ACERVULINA

| Test No. | Conc. Feed | Particle Size, Micra | Percent Control of Symptoms | Weight Changes | Mortality Treated Group | Mortality Untreated Group |
|---|---|---|---|---|---|---|
| 23 | 0.02500 | 74 | 0 | +26.5 | 1/4 | 2/4 |
| 24 | 0.02500 | <10 | 100 | +257.7 | 0/4 | 2/4 |

Tests Nos. 1 to 17 in the foregoing table relate to *Eimeria necatrix* infections and show the striking differences of activity between the various particle sizes of 4,4'-dinitrocarbanilide. In Nos. 1 to 7 appear the experimental results of the macroscopic dimensions of the compound above 10 micra. The control of symptoms achieved was zero or negligible. No mean weight changes of the birds were registrable, as deaths occurred in each group before the end of the experiment. In contrast thereto, tests Nos. 8 to 17 show the high potency of the same substance, as soon as it is reduced to its micronized or finely dispersed state. While a dosage level of 0.00625% did not yet affect the pathological syndrome to a very large extent, it was nevertheless most useful in completely preventing mortality. However, the response to the particle size of 2 to 5 micra (No. 16) in a concentration of 0.02500 was an 87% control of clinical symptoms, an appreciable weight gain of 166.5 gm. and a total suppression of mortality. In tests Nos. 10, 13 and 17 the drug was produced in situ by mixing 4-nitrophenylisocyanate with poultry feed in the above described manner. The chemotherapeutic effects were of the same order as in No. 16, yet heightened by the remarkable showing that even such low a dosage as 0.0125% (No. 10) was of no lesser benefit than the double amount used in the other test runs. The material employed in Nos. 14 and 15 was likewise prepared in situ by means of fuller's earth and feed and yielded the same prophylactic results. In tests Nos. 8 to 12 the drug was obtained by the aforementioned precipitation method from sulfuric acid solution.

Experiments Nos. 18 to 22 were conducted on *Eimeria tenella*. As shown in Nos. 18 and 19, the higher particle sizes of 74 and 3150 micra had no or very little activity. On the other hand, the subdivided form of the compound elicited a vigorous response (Nos. 20 to 22). In these experiments the drug was produced from 4-nitrophenylisocyanate in poultry feed, and with fuller's earth and poultry feed respectively.

Tests Nos. 23 and 24 show the action of the drug on *Eimeria acervulina*. While the particle size of 74 micra was without practical value in the control of symptoms and mortality, and furthermore permitted no more than a stunting growth of the order of 26.5 gm., the compound, when prepared in dispersed state from 4-nitrophenylisocyanate, fuller's earth and feed, produced a mean weight gain of about 260 gm. and provided 100% protection against pathological deviations and death loss.

What we claim is:

1. A composition for the control of coccidiosis consisting of a solid, orally ingestible, moisture-containing vehicle comprising from 0.00625% to 0.05% of 4,4'-dinitrocarbanilide having a particle size between 2 and 10 micra produced by the in situ reaction of 4-nitrophenylisocyanate with the moisture of said vehicle.

2. A composition in accordance with claim 1 wherein the moisture-containing vehicle is an animal feed.

3. A composition for the control of coccidiosis consisting of an animal feed ration to which has been added a moisture-containing clay comprising 4,4'-dinitrocarbanilide in a state of extreme fineness in an amount of 0.00625% to 0.05% by weight of the feed ration, said 4,4'-dinitrocarbanilide having a particle size between 2 and 10 micra and being produced by the in situ reaction of 4-nitrophenylisocyanate with the moisture of said clay.

4. The method of producing a coccidiostatic composition of 4,4'-dinitrocarbanilide in highly active and ingestible form having a particle size between 2 and 10 micra, comprising the step of intimately blending into a moisture-containing, orally ingestible solid vehicle 4-nitrophenylisocyanate in an amount of 0.0072% to 0.054% by weight of the composition.

5. A method in accordance with claim 4 wherein the moisture-containing vehicle is an animal feed ration.

References Cited in the file of this patent

UNITED STATES PATENTS 2,731,382    Basso _____ Jan. 17, 1956

OTHER REFERENCES

Arnold: J. of Chem. Education, vol. 34, No. 4, April 1957, pp. 158, 260–453A.

Clinical and Exptl. Use of Sulfanilamide, 1939, pp. 17 and 18.